United States Patent
Nordin et al.

(10) Patent No.: US 9,300,449 B2
(45) Date of Patent: Mar. 29, 2016

(54) TIME MULTIPLEXING BASED COMMON CHANNEL SCHEDULER ALGORITHM FOR FLEXIBLE RESOURCE SHARING

(75) Inventors: Arne Nordin, Djursholm (SE); Seungtai Kim, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 266 days.

(21) Appl. No.: 14/130,091

(22) PCT Filed: Feb. 23, 2012

(86) PCT No.: PCT/SE2012/050204
§ 371 (c)(1),
(2), (4) Date: Dec. 30, 2013

(87) PCT Pub. No.: WO2013/006110
PCT Pub. Date: Jan. 10, 2013

(65) Prior Publication Data
US 2014/0126515 A1 May 8, 2014

Related U.S. Application Data

(60) Provisional application No. 61/504,451, filed on Jul. 5, 2011.

(51) Int. Cl.
*H04W 16/14* (2009.01)
*H04L 5/00* (2006.01)
*H04W 72/12* (2009.01)

(52) U.S. Cl.
CPC ............. *H04L 5/0044* (2013.01); *H04W 16/14* (2013.01); *H04W 72/1273* (2013.01)

(58) Field of Classification Search
CPC .................... H04W 72/1221; H04W 72/1242; H04L 5/0044; H04L 5/003
See application file for complete search history.

(56) References Cited

U.S. PATENT DOCUMENTS

| 2008/0002712 A1 | 1/2008 | Ji et al. |
| 2008/0214200 A1 | 9/2008 | Grandblaise et al. |
| 2009/0154415 A1 | 6/2009 | Park et al. |

FOREIGN PATENT DOCUMENTS

| EP | 1443790 A1 | 8/2004 | |
| EP | 2151953 A1 | 2/2010 | |
| EP | 2493235 A1 * | 8/2012 | ........ H04W 72/1257 |

OTHER PUBLICATIONS

Sallent, O. et al., "Decentralized spectrum and radio resource management enabled by an on-demand Cognitive Pilot Channel", Annals of Telecommunications, vol. 63, No. 5/6, May 2008, 281-294.

*Primary Examiner* — Curtis A Alia
*Assistant Examiner* — Mark Besharat
(74) *Attorney, Agent, or Firm* — Patents on Demand, P.A.; Brian K. Buchheit; Scott M. Garrett

(57) ABSTRACT

The present disclosure relates to embodiments of a node entity and method for scheduling user data packets on a common channel of a base station node. The common channel being shared by a number of mobile telecommunications operators, OPi, i=1, 2, 3, .... The scheduling of the user data packets is performed in consecutive Transmission Time Intervals, TTIs, and in dependence of which operator OPi serving different user packets. During a TTI, the data packets are transmitted according to scheduling determined in the adjacent previous TTI. During the TTI, a scheduler controller calculates and determines the prioritized OPi for the next TTI, said calculation being performed by calculation based on the share of TTIs with competition per operator within a sliding window and a list keeping information based on a predetermined number of previous, consecutive TTIs within the sliding window.

16 Claims, 6 Drawing Sheets

US 9,300,449 B2

TIME MULTIPLEXING BASED COMMON CHANNEL SCHEDULER ALGORITHM FOR FLEXIBLE RESOURCE SHARING

TECHNICAL FIELD

This disclosure describes a method and a node entity for scheduling user data packets on a common channel.

BACKGROUND

In some situations several operators may want to share the same Radio Access Network, e.g. a WCDMA network. This may be due to Capital Expenditures/Operating Expenditures (CAPEX/OPEX) reasons or that not all sharing operators have their own license.

The current solutions do not solve the request from the customers. Today, there is no mechanism to allocate common channel resources, e.g. High-Speed Downlink Packet Access (HSDPA) resources, for transmission of data from the mobile network to the UEs, between sharing operators according to a pre-defined distribution.

SUMMARY

The following disclosure presents a number of aspects and embodiments for solving the stated problem.

According to one aspect, embodiments of a method for scheduling user data packets on a common channel of an access node are provided. The common channel being common and shared by a number of telecommunications operators, wherein the scheduling of the user data packets is performed in consecutive Transmission Time Intervals, TTIs, and in dependence of which operator serving different user packets. The method comprises determination of an operator to be prioritised in next TTI by performing calculation based on the share of TTIs with competition per operator within a sliding window and a sliding window list keeping information based on a predetermined number of previous, consecutive TTIs within the sliding window and scheduling of next TTI as a result of the determination of the prioritised operator. A TTI with competition is a TTI wherein data packets handled by different operators is competing for the same common channel resources in the beginning of the TTI and not all data packets have been scheduled for transmission during the TTI and a prioritised operator is an operator whose data packets is to be scheduled before the data packets of the competing operators in the next TTI. The method further comprises inserting said next TTI, when scheduled, into the sliding window and performing information updating of the sliding window list.

According to another aspect, embodiments of a node entity for scheduling user data packets on a common channel of a radio access node. The common channel is shared by a number of telecommunications operators. The scheduling of the user data packets is performed in consecutive Transmission Time Intervals, TTIs, and in dependence of which operator serving different user packets. The node entity comprises a scheduler controller comprising a scheduler algorithm block, which is configured to determine an operator to be prioritised in next TTI by performing calculation based on the share of TTIs with competition per operator within a sliding window and a sliding window list keeping information based on a predetermined number of previous, consecutive TTIs within the sliding window. The scheduler controller is further configured to schedule next TTI as a result of the determination of the prioritised operator. The scheduler controller is configured to insert said next TTI, when scheduled, into the sliding window. Further, the scheduler controller comprises means being configured to perform information updating of the sliding window list. A TTI with competition is a TTI wherein data packets handled by different operators is competing for the same common channel resources in the beginning of the TTI and not all data packets have been scheduled for transmission during the TTI and a prioritised operator is an operator whose data packets is to be scheduled before the data packets of the competing operators in the next TTI.

A number of embodiments are provided in the dependent claims of this disclosure.

The disclosed embodiments provide a straight forward way to share the common channel resource between operators by time multiplexing. The embodiments of the method are flexible regarding the number of participating operators as well as each operator share of the resource. In addition the QoS, i.e. Quality of Service, concept is kept among the subscribers of a participating operator.

The different aspects and embodiments thereof will also maintain a high degree of overall efficiency since data from non-prioritised operators will be multiplexed in the same TTI in order to use as much as possible of the available resources.

BRIEF DESCRIPTION OF THE DRAWINGS

The foregoing, and other, objects, features and advantages of the present embodiments will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present embodiments. However, it will be apparent to one skilled in the art that the present embodiments may be practiced in other embodiments that depart from these specific details. In other instances, detailed descriptions of well known methods, devices, and circuits are omitted so as not to obscure the description of the present embodiments with unnecessary detail.

Figure 1:
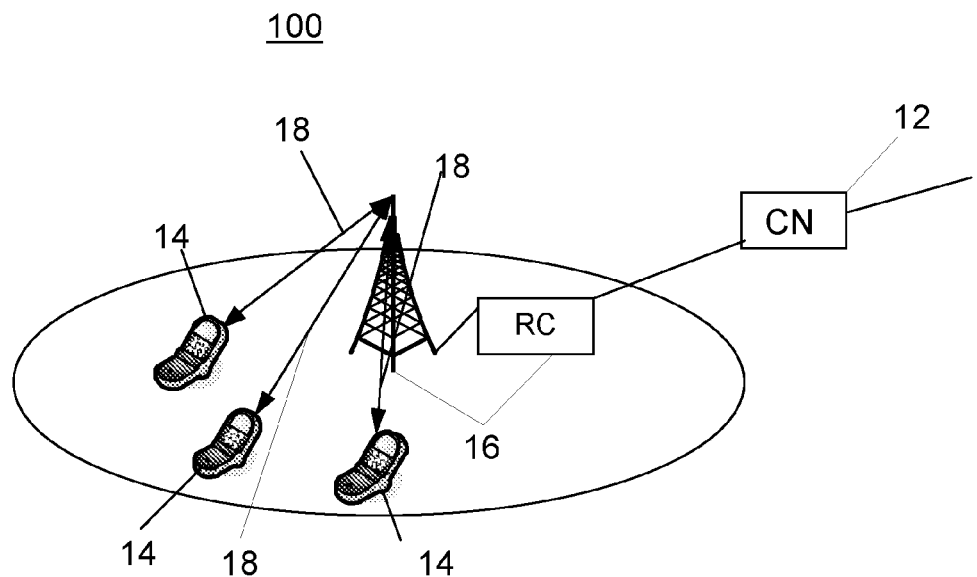
FIG. 1 is a block diagram illustrating a Radio Access Network wherein the different aspects and embodiments could be implemented.

Although the solutions described in this disclosure are meant to be implemented in any appropriate type of telecommunication system supporting any suitable communication standards and using any suitable components, particular embodiments of the described solutions may be implemented in a network, such as that illustrated in FIG. 1.

The wireless telecommunication system 100 comprises a number of Radio Access Networks, RANs, which may operate according to any radio access technology, e.g. Wideband Code Division Multiple Access (WCDMA), Long Term Evolution (LTE), Time Division Multiplex Access (TDMA), etc, Conceptually, a RAN resides between a User Equipment 14, such as a Mobile phone, a computer, or any remotely controlled machine and provides connection with a Core Network 12. A Radio Access Network RAN comprises at least one access node 16 for serving the users within areas, such as cells. The access node is illustrated as a base station system comprising an RC, Radio Controller, connected to a switching and/or routing functionality block SGSN, i.e. Serving GPRS Support Node, situated in the CN, i.e. Core Network, 12. The RC is also connected to a Base Station Transceiver or transceiver block comprising one or more transceiver devices, which is able to communicate with UEs over an air interface via a Radio Link 18. Said configuration is illustrated in more detail in FIG. 2. The radio link 18 comprises an uplink from the UE 14 to the access node 16 and a downlink (150 in FIG. 3) from the access node 16 to the UE 14. The downlink may be a HSDPA, i.e. a High-Speed Downlink Packet Access, link.

The present embodiments are not limited to any special radio access technology, and therefore any radio access standard may be used.

As shown in FIG. 1, the example network may include one or more instances of user equipments (UEs) 14 and one access node 16 capable of communicating with these UEs, along with any additional elements suitable to support communication between UEs or between a UE and another communication device (such as a landline telephone). The illustrated UEs may represent any communication devices that include any suitable combination of hardware and/or software. Similarly, although the illustrated base station may represent network node that include any suitable combination of hardware and/or software, these base stations may, in particular embodiments, represent devices such as the example base station illustrated in greater detail by FIG. 2.

Figure 2:
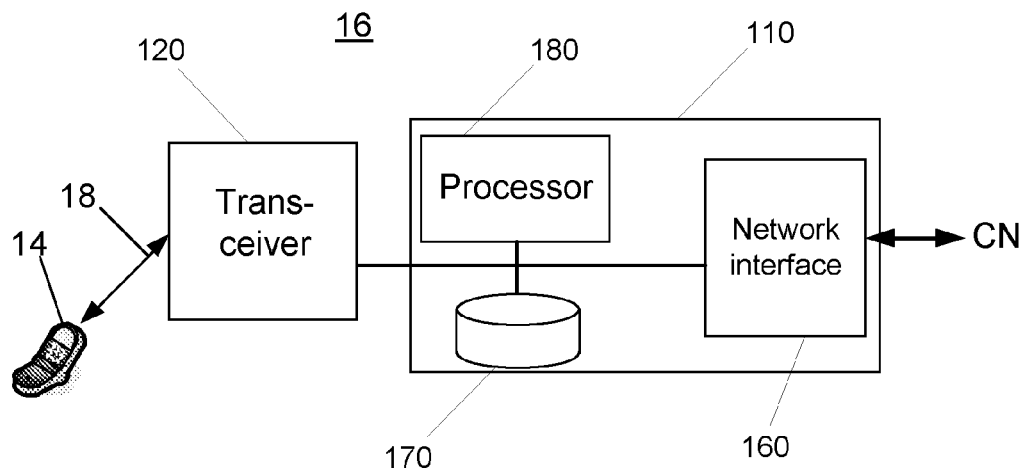
FIG. 2 is a block diagram illustrating a Radio Access Network wherein the different aspects and embodiments could be implemented.

As shown in FIG. 2, the exemplified access node 16 of a Radio Access Network involves an RC 110 comprising at least one RC processor 180, memory 170, and a Network interface 160. The access node 16 also comprises a transceiver block 120, and an antenna (not illustrated). The RC 110 is connected to the transceiver device/block 120 which is able to communicate with UEs 14 over an air interface via a Radio Link 18. The network interface 160 provides the communication functionality of receiving or sending data traffic via the backhaul network of the RAN with the CN 12 or with other Base Station System. In particular embodiments, some or all of the functionality described above as being provided by a mobile base station, a base station controller, a node B, an enhanced node B, eNodeB and/or any other type of mobile communications node may be provided by the RC processor 180 executing instructions stored on a computer-readable medium, such as the memory 170 shown in FIG. 2. Alternative embodiments of the base station may include additional components responsible for providing additional functionality, including any of the functionality identified hereafter and/or any functionality necessary to support the solution described in the following embodiments.

Figure 3:
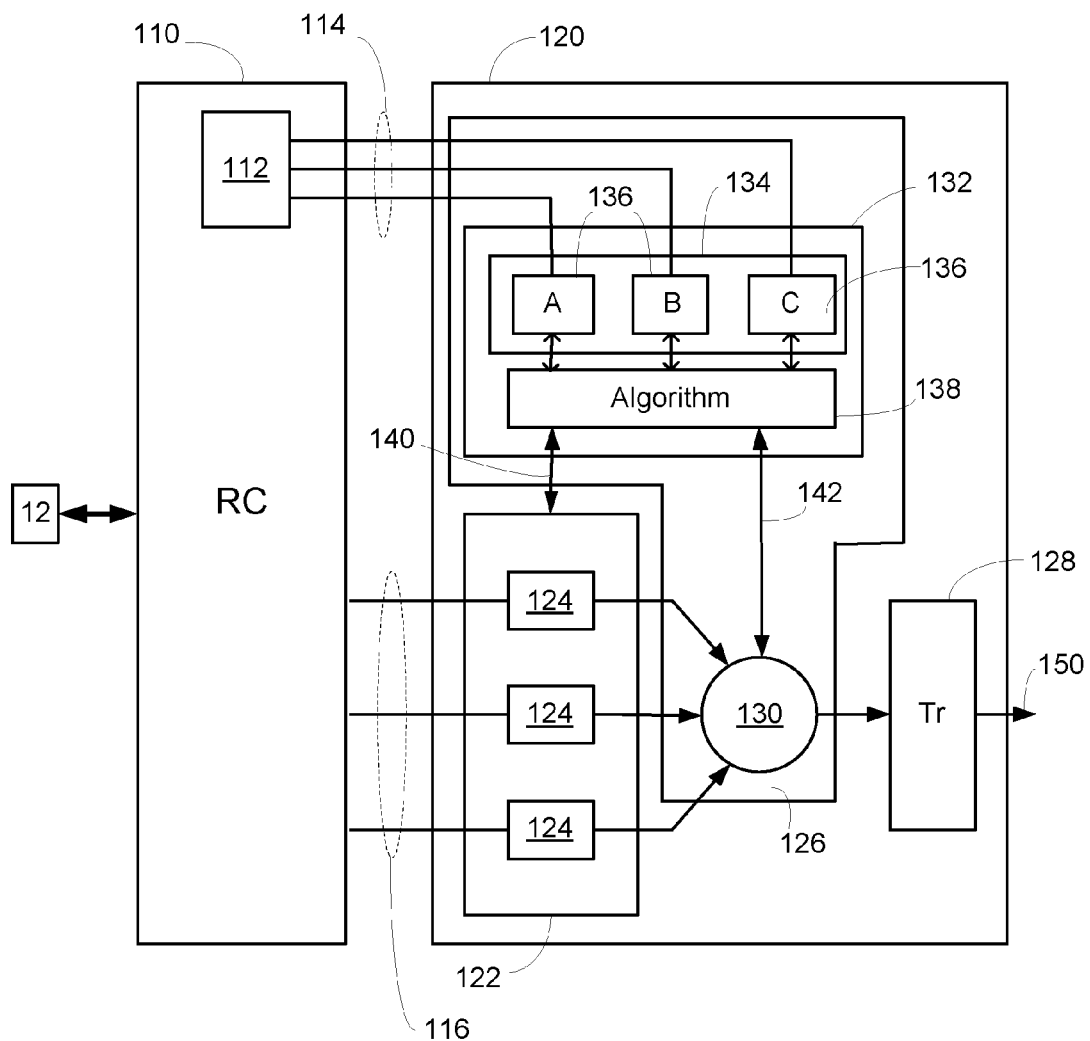
FIG. 3 is a block diagram illustrating an embodiment of an access node comprising a Radio Controller.

FIG. 3 is illustrating an embodiment of an access node comprising a Radio Controller, RC, 110. According to embodiments of the presented RC and transceiver block, said blocks are configured for serving a number of different mobile telecommunications operators at the same time. Data packets are received from or sent to a Core Network 12 for further distribution.

The structure of the RC is well-known and will not be further described besides a User-Operator identifier 112, which is configured to communicate with a transceiver block 120. The RC 110 feeds the transceiver block with data packets of user calls or services to a plurality of buffers 124 of a buffer block 122. The data packets are sent to the buffers 124 via interfaces 116. Said user call data packets are fed from the buffers 124 to a scheduler functionality device 130, which is controlled by a scheduler controller 132. Thus, the scheduler 126 comprises a scheduler functionality device 130 and a scheduler controller 132. The controller 132 is connected to the User-Operator identifier 112 through an interface 114. The User-Operator identifier 112 provides the scheduler controller 132 with information that identifies which operator serving which user, whose call/service data packets are to be scheduled and transmitted on a common channel 150 (18 in FIG. 1) by a transmitter block 128 via antennas (not shown) to the users.

The data packets are transmitted in repeated short time periods, Transmission Time Intervals, TTIs, to the UEs (14 in FIG. 1). The scheduler 126 is therefore configured to schedule the data packets to be sent in each TTI.

The scheduler controller 132 of the scheduler 126 comprises a bookkeeping block 134, which is a means for bookkeeping certain information concerning said TTIs, and a scheduling algorithm block 138, which is a means for scheduling the data packets in data buffers 124 to be sent in the TTIs. The scheduler 126 may therefore be configured to store information regarding a predetermined number of TTIs, which constitutes a sliding window. It is denoted sliding window because the TTIs are inserted and replaced by the scheduler, i.e. the oldest TTI is replaced by the latest scheduled TTI. Thus, the window is said to be moved, or slid, along with the TTI scheduling, which will be understood of the following description hereafter. The scheduling method may be generalized to involve a number of operators OPi, where $i=1, 2, 3, \ldots, N$ where N is the total number of operators sharing a resource. The sliding window may involve any predetermined number m of TTIs. A TTI may be 2 milliseconds. At the upstart, the sliding window is empty. Each new scheduled TTI is inserted into the sliding window. Until the number of TTIs in the sliding window has not reached the predetermined total number of TTIs, there will be no replacement of the oldest TTI in the sliding window.

The bookkeeping block 134 is configured to list in a sliding window list with m entries of the latest number of Transmission Time Intervals, TTIs. In said bookkeeping block 134, each operator OPi, in the figure illustrated as A, B, C has a memory entry 136 storing a predetermined number of TTIs, which could be updated by the scheduler controller 132. Thus, the bookkeeping block 134 is configured to read the content of the current sliding window after each move of the sliding window and to update the sliding window list, even denoted here as a bookkeeping list, with the number of TTIs with competition and for each TTI with competition it is recorded which operator OPi that was prioritised during said TTI. The scheduler algorithm block 138 uses the stored number of TTIs in each cell for calculating which of the operators to be prioritised in the next coming TTI. The scheduler controller 132 is connected to the buffer block 122 via an interface 140 for collecting input data from the buffers 124 in the buffer block 122. The scheduler controller 132 is further connected to the scheduler 130 via interface 142 for controlling the scheduler 130, e.g. sending information to the scheduler which of the operators A, B, C, . . . is determined to be prioritised. Embodiments of said calculation operation will be described in more detail below.

According to embodiments of the present disclosure it is suggested to introduce scheduling according to TTI with competition. Each sharing operator will be assigned a configurable percentage value which is used by the new common channel scheduler to allocate the resource accordingly. An TTI with competition is a TTI wherein data packets handled by different operators is competing for the same common channel resources in the beginning of the TTI and not all data packets have been scheduled for transmission during the TTI and a prioritised operator is an operator whose data packets are to be scheduled before the data packets of the competing operators in the next TTI.

One exemplary embodiment comprise of two parts. One part is bookkeeping of the most recent actual scheduling of TTIs. The other part is how to schedule the operators and their data packets in the next TTI. Exemplary methodologies for these parts are provided below.

1) Bookkeeping

Bookkeeping involves insertion of next TTI into sliding window and perform information updating of sliding window list. The scheduler 126 is configured to keep a list, or record, with m entries of the latest TTIs within a sliding window. Such a list or record comprises one entry 136 for each operator A, B, C, . . . . For each entry 136 in the list, the bookkeeping block 134 keeps a record of the operator which was prioritised in that TTI. When a new TTI with competition has occurred, the bookkeeping block 134 replaces the oldest entry in the list with the newly occurred.

2) Scheduling Next TTI

Scheduling involves determination of an operator to be prioritised in next TTI by performing calculation and scheduling of next TTI as a result of the determination of the prioritised operator OPi. The scheduler algorithm block 138 involves a scheduling algorithm comprising processes for calculating each operator's share of the common channel resource from the information I the bookkeeping list. The operator with the largest deviation from its configured share will get the highest priority in the next TTI. Thus, with this algorithm each operator will get its share of the TTIs. The scheduling is performed in the present TTI. The task for the scheduler is to schedule how data shall be sent in the next, adjacent TTI. The following example could exemplify the calculation process:

Let n denote the total number of TTIs with competition in the sliding window, and, nTTIa, nTTIb and nTTIc the number of TTIs with competition for each of the 3 operators. The share of TTIs with competition per operator in the sliding window can then be calculated as $a = nTTIa/n$ $b = nTTIb/n$ $c = nTTIc/n$ Let now x, y and z denote the wanted share for operator A, B and C. The deviations between the wanted share and the actual share is $da = x - a$ $db = y - b$ $dc = z - c$ Find max[da, db, dc] and prioritise the corresponding operator in the upcoming TTI. As much as possible of this operators data will then be sent. However, if there is still room for sending more data, users from the other operators is then multiplexed in the same TTI.

The sliding window can now be moved forward one TTI and the process continued for the next TTI.

By applying weights on the users with different QoS classes for an operator, it is possible to differentiate the priority for example between Gold, Silver and Bronze users per operator.

Figure 4:
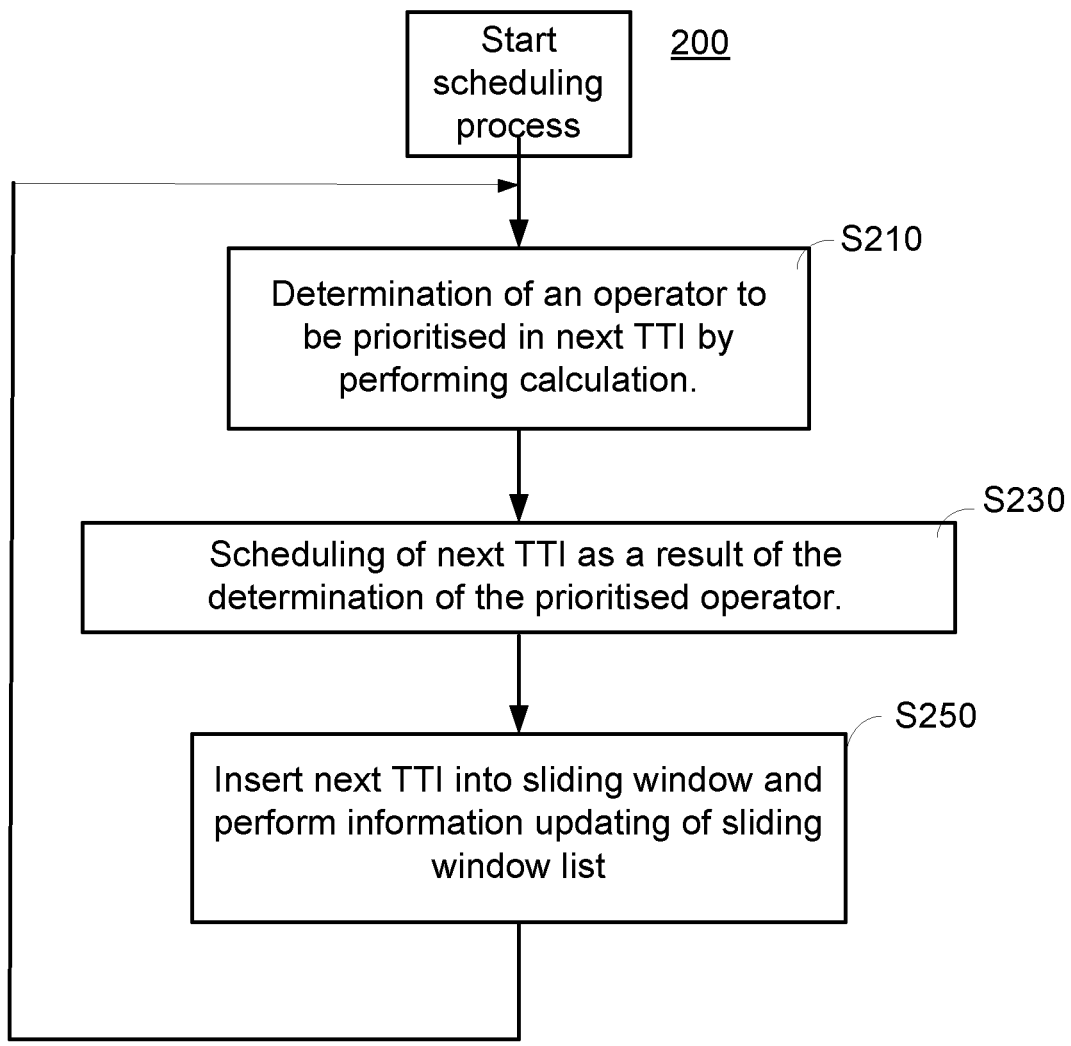
FIG. 4 is a flowchart of embodiments of the present scheduling process in accordance with this disclosure.

FIG. 4 illustrates a flowchart of embodiments of the present scheduling process in accordance with this disclosure.

In a more general aspect, the scheduling method may be generalized to involve a number of operators OPi, where i=1, 2, 3, . . . , N where N is the total number of operators sharing a resource, such as NodeB, eNodeB, Base Station System (BSS). The sliding window may involve any number of TTIs, e.g. the sliding window may be predetermined to involve m TTIs. A TTI may be 2 milliseconds.

Figure 5:
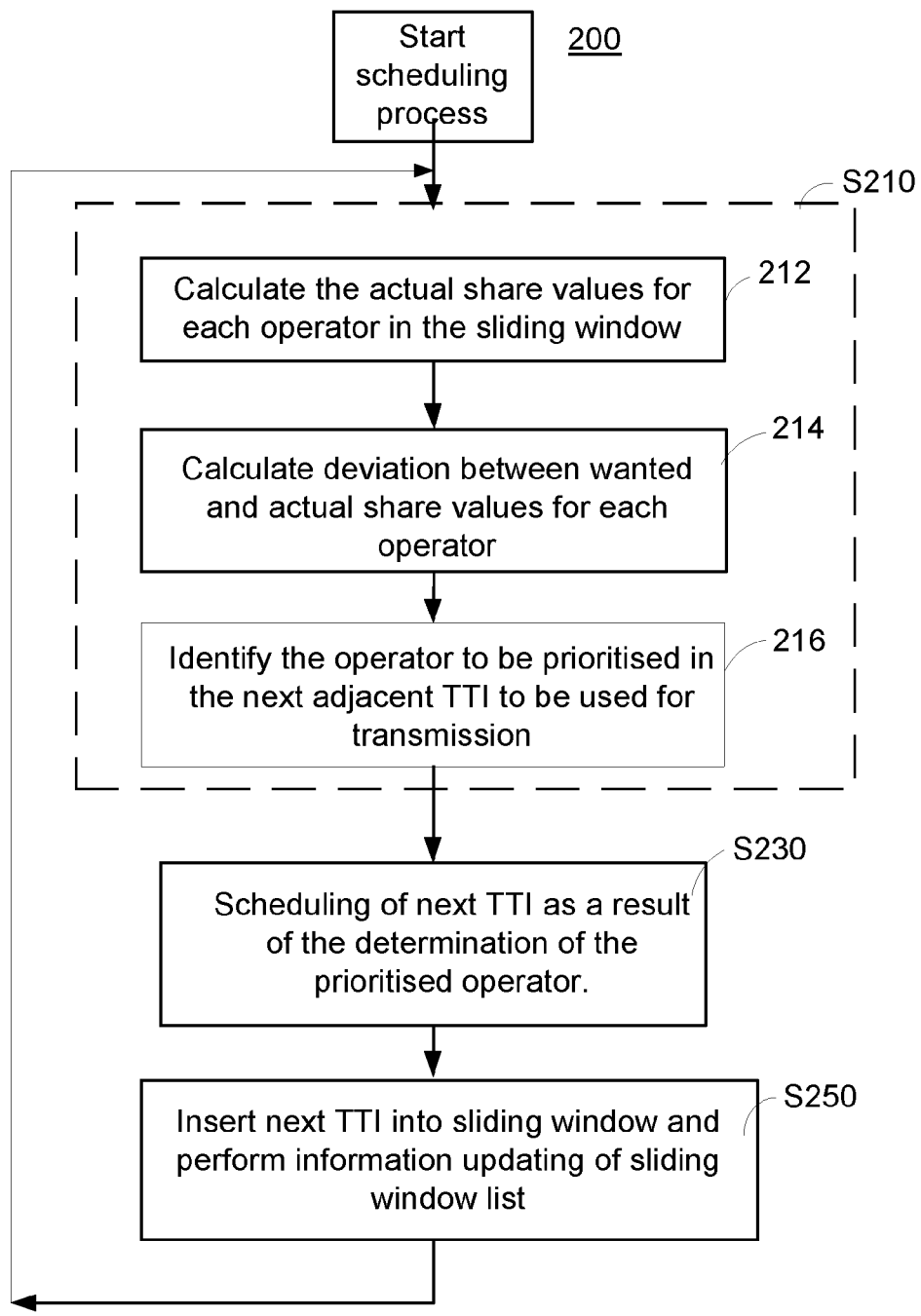
FIG. 5 is a flowchart of embodiments of a sub-process of the present scheduling process in accordance with this disclosure.

An example of an embodiment of a scheduling method may comprise:

S210: Determination of an operator to be prioritised in next TTI by performing calculation. A new Transmission Time Interval, TTI, is started and data packets are transmitted according to scheduling determined in the adjacent previous TTI. As already said, the scheduling process is taking place in consecutive TTIs. First it has to be determined which OPi that is prioritised in the next TTI. Embodiments of step S210 is illustrated in the flowchart of FIG. 5. The scheduler algorithm block 138 of the scheduler controller 132 is configured to calculate each operator's share of a common channel resource, e.g. HSDPA, using the bookkeeping list and the sliding window set in the adjacent previous TTI. The operator with the largest deviation from its configured share will get the highest priority in the next TTI. Thus, with this algorithm each operator will get its share of the TTIs.

S230: Scheduling of next TTI as a result of the determination of the prioritised operator OPi. The scheduling of the data packets always starts with the data packets of the prioritised operator OPi. As much as possible of this operator's data is scheduled. However, if there is still room for scheduling more data, users from the other operators is then multiplexed in the same TTI. At the start of a new TTI, the scheduler controller 132 may shift the scheduling scheme used for scheduling the different mobile telecommunications operators OPi and change certain scheduling conditions and requirements, e.g. which operator to be set to prioritised operator during the scheduled TTI. When the scheduling is finished, the sliding window is moved one TTI forward.

S250: Insert next TTI into sliding window and perform information updating of sliding window list. The scheduler 126 moves/slides the sliding window one TTI forward for adding the next TTI, scheduled in S230. The scheduler controller is configured to perform information updating of sliding window list. This is denoted as the bookkeeping part/step of the process and it is controlled by the bookkeeping block 134 in the scheduler controller 132. The new scheduled TTI is introduced in the sliding window and the oldest TTI is released. The scheduler controller 132 comprises the bookkeeping block 134 which is configured to check the bookkeeping list due to the slide/movement of the sliding window and to delete in the list the entry of the oldest TTI. The prioritised OPi identified for the scheduled TTI is booked, i.e. recorded, for said TTI. When the sliding window has been moved one TTI, the scheduled TTI is introduced in the sliding window and the oldest TTI is released, and the sliding window list has to be updated. A number of entries in the list may have to be updated, such as:

n, which is the total number of TTIs with competition;

nTTI$_i$, which is the number of TTIs with competition for operator OPi;

the inserted, scheduled TTI has to be identified and marked as a TTI with or without competition. The scheduled TTI is the latest TTI introduced into the sliding window;

Which OPi that is prioritised in the inserted, scheduled TTI

Different scenarios are possible:

Neither the inserted TTI, nor the released TTI are TTIs with competition:
- n, nTT$_i$ are not amended;
- the inserted TTI has to be identified and marked as a TTI without competition;
- the OPi that is prioritised in the inserted TTI.

The inserted TTI is a TTI with competition, but not the released TTI:
- n=n+1, thus the total number of TTIs has increased with 1;
- nTTI$_i$=nTT$_i$+1 for operator OPi who is determined to be prioritised in the inserted TTI;
- the inserted TTI has to be identified and marked as a TTI with competition;
- the OPi that is prioritised in the inserted TTI.

The inserted TTI is a TTI without competition, but the released TTI is a TTI with competition:
- n=n−1
- nTTIi=nTTi−1 for operator OPi, who was prioritised in the released TTI;
- the inserted TTI has to be identified and marked as a TTI without competition;
- the OPi that is prioritised in the inserted TTI.

Both the inserted TTI and the released TTI are TTIs with competition:
- n is unamended;
- nTTI$_i$=nTT$_i$−1 for operator OPi, who was prioritised in the released TTI, and nTTI$_i$=nTT$_i$+1 for operator OPi, who is prioritised in the inserted TTI. If it is the same operator that is prioritised in the two TTIs, nTTIi for operator OPi is not updated.
- The inserted TTI has to be identified and marked as a TTI with competition;
- the OPi that is prioritised in the inserted TTI.

When step S250 has been performed, the scheduler controller is configured to go to step S210.

With reference to FIG. 5, step S210 will now be described in more detail. In this step, also denoted as the second part, part 2, of the process, the start of the scheduling in the next TTI is determined. The following steps may preferable be performed by the S212: Calculate the actual share value for each OPi listed in the sliding window list. Thus, the scheduler algorithm block 138 is configured to calculate each operator's share of the HSDPA resource from the bookkeeping list, i.e. the sliding window list. An example of a formula for calculating an operator's share is described here. Let n denote the total number of TTIs with competition in the sliding window list, nTTI$_i$ is the number of TTIs with competition associated with the N operators OP$_i$. The share value x$_i$ of TTIs per operator OPi in the sliding window can then be calculated as $$x_i = nTTI_i/n$$

S214: Calculate deviation between wanted and actual share values for each OPi. Thus, the scheduler algorithm block 138 is configured to calculate the deviation between wanted and actual share values for each OPi. An example of a formula for calculating between wanted and actual share values for an operator may be the following equation. Let now Y$_i$ denote the wanted share for operator OPi, where i=1, 2, 3, . . . N, N is the total number of operators sharing a resource, such as NodeB, eNodeB, RBS. The deviations between the wanted share Y$_i$ and the actual share x$_i$ for an operator OPi is $$dx_i = Y_i - x_i, \text{ where } i=1,2,3,\ldots N.$$

S216: Determine the OPi to be prioritised in the next adjacent TTI to be used for transmission. The scheduler algorithm block 138 of the scheduler controller is further configured to determine the OPi to be prioritised in the next adjacent TTI. This determining may be done by means of the maximum formula $$\max_i [dx_i], \text{ where } i = 1, 2, 3, \ldots N.$$

The operator OPi for which the deviation value dx$_i$ is maximum may be prioritised in the next TTI. As much as possible of this operator's data will then be sent. However, if there is still room for sending more data users from the other operators is then multiplexed in the same TTI.

When step S216 has been performed, the scheduler controller is configured to go to step S230: Scheduling of the next TTI. When step S230 has been performed, the scheduler controller is configured to go to step S250: Insert next TTI into sliding window and perform information updating of sliding window list. In this step, the sliding window is moved one step forward for incorporating the previous TTI. The window comprises a constant number of TTIs, e.g. m=1024 TTIs. The oldest TTI within the sliding window is replaced, by the new calculated TTI. After that, the scheduler controller performs updating of sliding window list. This is denoted as the bookkeeping part of the process. The scheduler controller is configured to check the bookkeeping list and to delete in the list the entry of the OPi for the oldest TTI if it is represented in said list.

Figure 6:
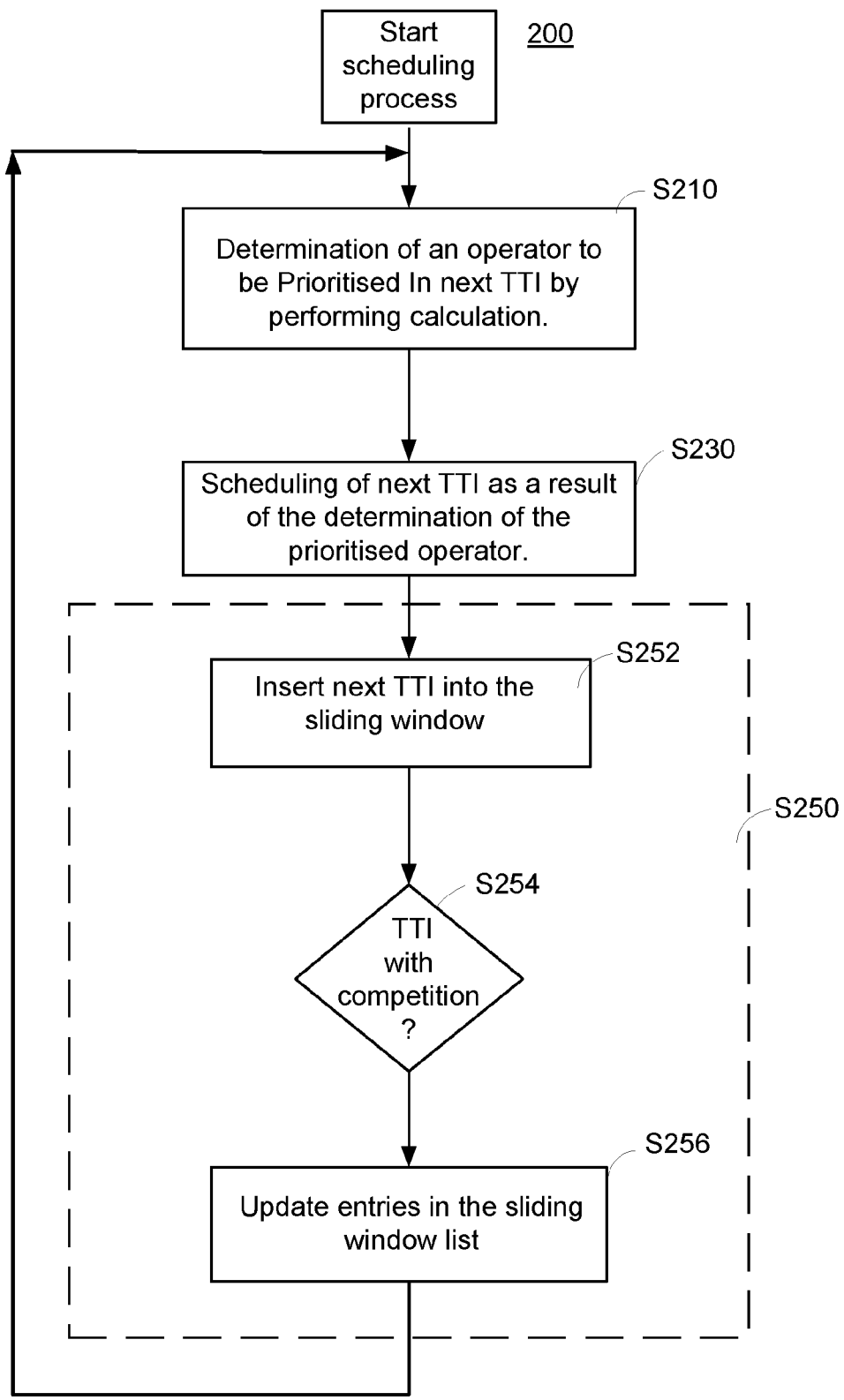
FIG. 6 is a flowchart of embodiments of another sub-process of the present scheduling process in accordance with this disclosure.

With reference to FIG. 6, step S250 will now be described in more detail. The step, also denoted as the bookkeeping process, may comprise following sub-processes/steps:

S252: Slide window, i.e. move window, one TTI. In this step, the sliding window is moved by the scheduler controller 132 one step forward for incorporating the previous TTI. The window comprises a constant number of TTIs, e.g. m=1024 TTIs. The oldest TTI within the sliding window is replaced, by the new calculated TTI.

S254: Test: TTI with competition? If in the end of the present TTI any buffer of the buffer block will contain remaining user data packets that should have been sent in said TTI, the bookkeeping block 134 of the scheduler controller 132 indicates that the TTI is a TTI with competition—"YES". However, if the remaining user data packets are served by the same operator OPi which was indicated as prioritised, the TTI is not a TTI with competition as an operator is not considered to compete with itself. If the test indicates that the present TTI is not a TTI with competition, i.e. test indicates "NO". The test will also indicate the TTI as a TTI without competition, "no", if all user data packets in the TTI has been scheduled, and there is no remaining data packets to be scheduled in the next TTI.

S256: Update entries in the sliding window list. Due to the test in step S254, the present TTI is either indicated as a TTI with competition or without competition. The bookkeeping block 134 is configured to update the entries in the bookkeeping list, i.e. sliding window list.

When step S256 has been performed, the scheduler controller is configured to go to step S210.

Embodiments of the invention provide a simple and straight forward way to share the common channel resource between operators by time multiplexing. The new method is flexible regarding the number of participating operators as well as each operator share of the resource. In addition the QoS concept is kept among the subscribers of a participating operator.

Figure 7:
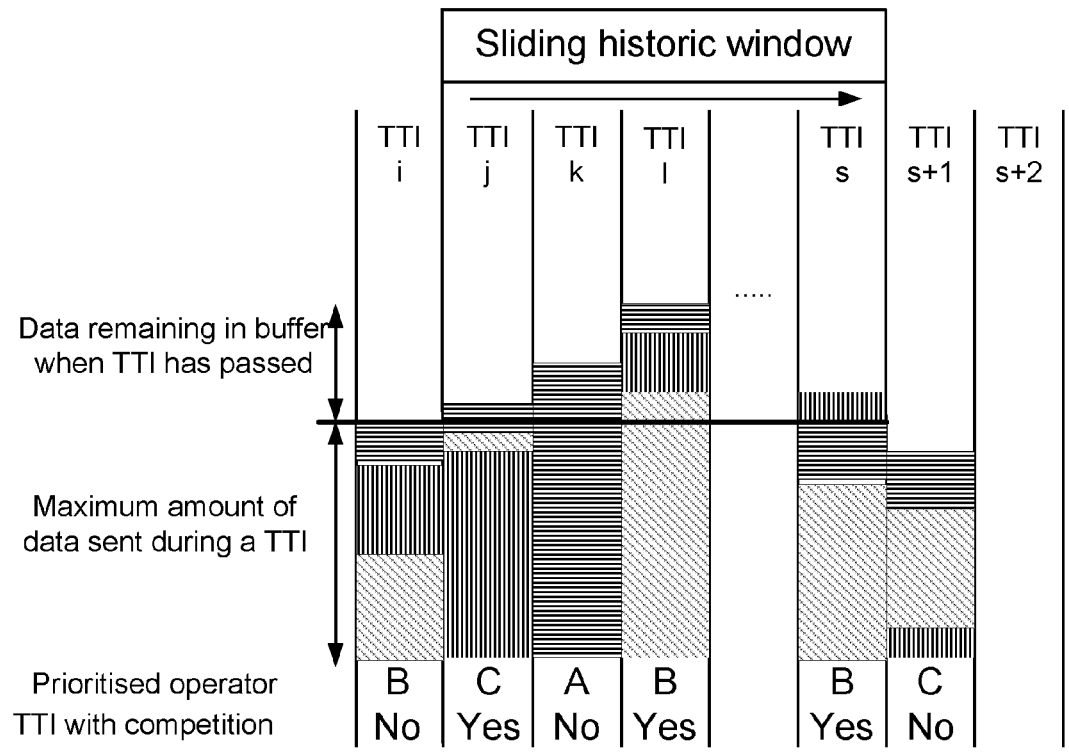
FIG. 7 is a block diagram illustrating a number of consecutive TTI:s and examples of how the described embodiments schedule operators' data packets.

The operation of examples of the above embodiments will now be described in more detail with reference to FIG. 7. In FIG. 7 a number of TTIs and a sliding historic window are illustrated. Both ends of the sliding historic window are illustrated. Said sliding window, i.e. sliding historic window, comprises a predetermined number of continuously consecutive TTIs. For reasons of simplicity, the TTIs in the middle are left out in the figure, because a sliding window may comprise a great number of TTIs. For further reasons of simplicity, an access node serving three mobile telecommunications operators OP A, OP B, OP C is described. Each TTI is 2 milliseconds long. Each operator is serving a number of users and their user equipments, which generate data packets to be sent via a common channel, e.g. HSDPA downlink, by the access node to a receiving user and user equipment. The data packets from a certain user to a receiving user are allocated to a buffer of the buffer block. All operators will share the same resources, e.g. buffer block. The buffers may not be emptied during a TTI due to a number of circumstances, e.g. the momentary quality of the downlink channel and reception condition, the inflow of data packets are momentary high. Thus, during different TTIs different amounts of data packets are able to be sent. In the figure, a horizontal line is illustrating the maximal data packet capacity to be sent during a TTI. By means of simplicity, the maximal capacity is set to be constant during a time period. Within a TTI, data packets below said line has been sent, while data packets over said line has not been sent and said data packets have to be sent during the adjacent following TTI. User data packets belonging to one user are served by one of the operators. The different amounts of data packets are illustrated as blocks having different heights within a TTI. The shading of each block of data packets indicates which operator said data packets belong to.

Thus, in FIG. 7, an example is shown for a number of consecutive TTIs, TTIi, TTIj, TTIk, TTIl, and TTIm, TTIm+1, TTIm+2. The scenario in the example is that 3 operators, OP A, OP B and OP C are sharing the same common channel, the data for each operator is shown with a specific pattern. The TTIs in the sliding window is also shown. In TTI=TTIj, Operator OP C is prioritised and since there will be data left when the TTI has passed, this is marked as a TTI with competition and added to Operator OP C. In TTI=TTIk, Operator OP A is prioritised and there will be unsent data left when the TTI has passed but this data belongs to Operator OP A and since an operator cannot compete with itself, the TTI is not marked as a TTI with competition. The rest of the TTIs follow the same principle, which now will be described in more detail.

Starting with TTI=TTIi, according to the operation of embodiments of the present scheduler, steps S210, S230 and S250 are performed during the TTI for scheduling the data packets to be transmitted in the next TTI, TTI=TTIj. In step S210, operator OP C is determined to be prioritised in TTI=TTIj. The data packets of users served by OP C are therefore first scheduled, S230. As much as possible of this operator's data is scheduled. When all packets of OP C have been scheduled, data packets of users served by OP B and OP A may be scheduled. The scheduling process is finished by performing the sliding and bookkeeping step S250 wherein the sliding window list is updated. Due to the amount of buffered data packets in buffers 124 (see FIG. 2), the scheduler controller is configured to check, according to step S254, if all data packets in the buffers will be transmitted before the ending of the TTI=TTIj. In the example, the test in step S254 will indicate that not all data packets in the buffers will be transmitted before the ending of the TTI=TTIj. The scheduler is therefore configured to determine and set TTIj is a TTI with competition. The TTI is indicated with "yes" in the TTI with competition field in the sliding window list. As OP C, in step S210, was determined as the prioritised operator. OP C is therefore registered in the bookkeeping/sliding window list by the bookkeeping block of the scheduler for TTIj.

Data packets from the buffers 124 (see FIG. 2) are transmitted as earlier scheduled on the HSDPA during the TTI.

In the next following interval, TTIj, a new prioritised operator has to be determined for TTI=TTIk. Steps S210, S230 and S250 are performed during the TTI for scheduling the data packets to be transmitted in the next TTI, TTI=TTIk. In step S210, operator OP A is determined to be prioritised in TTI=TTIk. The data packets of users served by OP A are therefore first scheduled in S230. As much as possible of this operator's data is scheduled. In this example, all packets of OP A have not been scheduled within the TTI. The scheduling process is finished by performing the sliding and bookkeeping step S250 wherein the sliding window list is updated. Due to the amount of buffered data packets in buffers 124 (see FIG. 2), the scheduler controller is configured to check, according to step S254, if all data packets in the buffers will be transmitted before the ending of the TTI=TTIk. In the example, the test in step S254 will indicate that not all data packets in the buffers will be transmitted before the ending of the TTI=TTIk. The scheduler is therefore configured to determine if TTIk is a TTI with competition. But the remaining data packets are served by OP A and no other operator, and an operator is not supposed to compete with itself, the TTI is therefore indicated with "no" in the TTI with competition field in the sliding window list. In step S210, OP A was determined as the prioritised operator and OP A is therefore registered in the bookkeeping/sliding window list as prioritised by the bookkeeping block of the scheduler for TTIj.

Data packets from the buffers 124 (see FIG. 2) are transmitted on the HSDPA simultaneously during the TTI.

In the next following interval, TTIk, a new prioritised operator has to be determined for TTI=TTIl. Steps S210, S230 and S250 are performed during the TTI for scheduling the data packets to be transmitted in the next TTI, TTI=TTIl. In step S210, operator OP B is determined to be prioritised in TTI=TTIl. The data packets of users served by OP B are therefore first scheduled in S230. As much as possible of this operator's data is scheduled for transmission in TTIl. In this example, all packets of OP B cannot be scheduled within the TTI. The scheduling process is finished by performing the sliding step and bookkeeping step S250 wherein the sliding window list is updated. Due to the amount of buffered data packets in buffers 124 (see FIG. 2), the scheduler controller is configured to check, according to step S254, if all data packets in the buffers will be transmitted before the ending of the TTI=TTIl. In the example, the test in step S254 will indicate that not all data packets in the buffers will be transmitted before the ending of the TTI=TTIl. The scheduler is therefore configured to determine if TTIk is a TTI with competition. As the remaining un-scheduled data packets also belong to other operators, the TTI is indicated with "yes" in the TTI with competition field in the sliding window list. In step S210, OP B was determined as the prioritised operator and OP B is therefore registered in the bookkeeping/sliding window list as prioritised by the bookkeeping block of the scheduler for TTIk.

The scheduling process will be repeated for the following TTIs as described above.

How the sliding historic window is used is also illustrated in FIG. 7. This operation relates to step S250 in FIG. 4. Said sliding window includes all the TTIs between TTIj, which is the oldest TTI of the sliding window, and TTIs, which is denoted as the latest TTI, and which is the present TTI where the scheduling and the bookkeeping is taking place.

In the next following interval, TTIs, a new prioritised operator has to be determined for TTI=TTIs+1. Steps S210, S230 and S250 are performed during the TTI for scheduling the data packets to be transmitted in the next TTI, TTI=TTIs+1. In step S210, operator OP C is determined by calculation to be prioritised in TTI=TTIs+1. This step S210 will now be described in more detail.

The scheduler 126 calculates, e.g. by means of the scheduler controller 132, each operator's share of the HSDPA resource from the bookkeeping list. The operator with the largest deviation from its configured share will get the highest priority in the next TTI. Thus, with this algorithm each operator will get its share of the TTIs. As an example, in FIG. 7, if TTI=TTIs is "now", the task for the scheduler is to schedule how data shall be sent in TTI=s+1. Let n denote the total number of TTIs with competition in the sliding window, nTTIa, nTTIb and nTTIc the number of TTIs with competition for each of the 3 operators. In step S212, the share of TTIs per operator in the sliding window can then be calculated as $$a=nTTIa/n$$

$$b=nTTIb/n$$

$$c=nTTIc/n$$

Let now x, y and z denote the wanted share for operators OP A, OP B and OP C. In step S214, the deviations between the wanted share and the actual share is calculated as $$da=x-a$$

$$db=y-b$$

$$dc=z-c$$

Thereafter, it is possible to calculate max[da, db, dc] as in step S216 and prioritise the corresponding operator in the upcoming TTI.

As, an example a sliding window may comprise m=9 TTIs. If the number of TTIs with competition is 3 for operator A, i.e. nTTIa=3, further nTTIb=2 and nTTIc=1 in a sliding window, the total number of TTI with competition is n=6 and x=y=z=⅓, this results in the following parameter values, $$da=1/3-3/6=-1/6;$$

$$db=1/3-2/6=0;$$

$$dc=1/3-1/6=1/6$$

The maximum formula then is $$Max[-1/6,0,1/6]=1/6,$$

which is the parameter value for operator C. Thus, operator C is prioritised in the next TTI.

The data packets of users served by OP C are therefore first scheduled in S230. As much as possible of this operator's data is scheduled. In this example, all packets of OP C are scheduled within the TTI. When all packets of OP C have been scheduled, data packets of users served by OP B and OP A are scheduled.

The scheduling process is finished by performing the sliding and bookkeeping step S250 wherein the sliding window list is updated.

In the sliding and bookkeeping step, S250, the sliding historic window is moved one TTI. This means that TTI=TTIj is realised, and the TTI=TTIm+1 is inserted in the sliding window and it has to be booked. Due to the amount of buffered data packets in buffers 124 (see FIG. 2), the scheduler controller is configured to check, according to step S254, if all data packets in the buffers will be transmitted before the ending of the TTI=TTIs+1. In the example, the test in step S254 will indicate that all data packets in the buffers will be transmitted before the ending of the TTI=TTIs+1. The scheduler is therefore configured to determine if TTIs+1 is a TTI with competition. All data packets are scheduled, the TTI is therefore indicated with "no" in the TTI with competition field in the sliding window list. Now step S256 may be performed, wherein the entries in the sliding window list are updated. If the present TTI is indicated as a TTI with competition, the bookkeeping block 134 is configured to update the entry for the prioritised operator in the present TTI in the bookkeeping list, i.e. sliding window list. Following scenario and condition are present:

TTI=TTIs+1 is a TTI without competition, but the released TTI, TTI=TTIj is a TTI with competition:
n is set as n=n−1
nTTIC=nTTC−1 for operator OP C, who was prioritised in the released TTI;
TTI=TTIs+1 is marked as a TTI without competition;
OP C is prioritised in TTIs+1, because in step S210, OP C was determined as the prioritised operator.

OP C is therefore registered in the bookkeeping/sliding window list as prioritised by the bookkeeping block of the scheduler for TTIs+1.

When step S256 has been performed, the scheduler controller is configured to go to step S210.

Embodiments of the invention will also maintain a high degree of overall efficiency since data from non-prioritised operators will be multiplexed in the same TTI in order to use as much as possible of the available resources.

The above-indicated procedures may, for example, be performed by one or more schedulers located in one or more suitable nodes of the network.

The described embodiments may be implemented in digital electronically circuitry, or in computer hardware, firmware, software, or in combinations of them. Apparatus of described embodiments may be implemented in a computer program product tangibly embodied in a machine readable storage device for execution by a programmable processor; and method steps of the invention may be performed by a programmable processor executing a program of instructions to perform functions of the described embodiments by operating on input data and generating output.

The described embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor such as the scheduler controller 126 (see FIG. 3) will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

A number of embodiments of this disclosure have been described. It will be understood that various modifications may be made without departing from the scope of the described embodiments. Therefore, other implementations are within the scope of the following claims.

The invention claimed is:

1. A method for scheduling user data packets on a common channel of an access node in a radio access network, said common channel being common and shared by a number of telecommunications operators, wherein the scheduling of the user data packets is performed in consecutive transmission time intervals (TTIs) and in dependence on which scheduling said operators serve different user packets, said method comprising:
determining an operator to be prioritized in a next TTI by performing a calculation based on the share, per operator, of TTIs with competition that fall within a sliding window, and further based on a sliding window list that keeps information based on a predetermined number of previous, consecutive TTIs within the sliding window, where a TTI with competition is a TTI in which data packets handled by different operators are competing for the same common channel resources in the beginning of the TTI and not all data packets have been scheduled for transmission during the TTI, and where a prioritized operator is an operator whose data packets are to be scheduled before the data packets of competing operators in the next TTI;
scheduling the next TTI as a result of the determination of the prioritized operator; and
including said next TTI, when scheduled, into the sliding window and performing information updating of the sliding window list.

2. The method of claim 1, wherein the determining of the prioritized operator comprises calculating, for each operator listed in the sliding window list, an actual share value, where the actual share value of an operator is the share of TTIs with competition in the sliding window.

3. The method of claim 2, wherein the determining of the prioritized operator further comprises calculating a deviation between a wanted share value and an actual share value for each operator, where the wanted share value is a configured share allocated to an operator.

4. The method of claim 3, wherein the determining of the prioritized operator further comprises determining the operator to be prioritized in the next TTI to be used for transmission based on the calculated deviation values between wanted and actual share values for each of the competing operators.

5. The method of claim 4, wherein the determining of the prioritized operator further comprises determining the operator to be prioritized in the next TTI to be used for transmission by selecting the operator whose calculated deviation value between wanted and actual share values is the maximum value of the deviation values of the competing operators.

6. The method of claim 1, wherein the information updating of the sliding window list comprises testing whether the next TTI is a TTI with competition.

7. The method of claim 6, wherein the information updating of the sliding window list further comprises updating entries in the sliding window list.

8. The method of claim 7, wherein the sliding window list comprises at least one of the following entries:
n, which is the total number of TTIs with competition;
nTTIi, which is the number of TTIs with competition for operator;
the inserted, scheduled TTI, which is identified and marked as a TTI with or without competition, where the scheduled TTI is the latest TTI introduced into the sliding window; and
which operator that is prioritized in the inserted, scheduled TTI.

9. A node entity for scheduling user data packets on a common channel of an access node of a radio access network, said common channel being common and shared by a number of telecommunications operators, wherein the scheduling of the user data packets is performed in consecutive transmission time intervals (TTIs) and in dependence on which scheduling said operators serve different user packets, said node entity comprising a scheduler controller that comprises a scheduler algorithm block configured to:
determine an operator to be prioritized in a next TTI by performing a calculation based on the share, per operator, of TTIs with competition within a sliding window and further based on a sliding window list that keeps information based on a predetermined number of previous, consecutive TTIs within the sliding window, where a TTI with competition is a TTI in which data packets handled by different operators are competing for the same common channel resources in the beginning of the TTI and not all data packets have been scheduled for transmission during the TTI, and where a prioritized operator is an operator whose data packets are to be scheduled before the data packets of the competing operators in the next TTI; and
schedule the next TTI as a result of the determination of the prioritized operator;
wherein the schedule controller is configured to include said next TTI, when scheduled, into the sliding window, and perform information updating of the sliding window list.

10. The node entity of claim 9, wherein the scheduler controller is configured to calculate an actual share value for each operator listed in the sliding window list, where the actual share value of an operator is the share of TTIs with competition within the sliding window.

11. The node entity of claim 10, wherein the scheduler controller is further configured to calculate a deviation between a wanted share value and the actual share value for each operator, where the wanted share value is a configured share allocated to an operator.

12. The node entity of claim 11, wherein the scheduler controller is further configured to determine the operator to be prioritized in the next TTI to be used for transmission based on the calculated deviation values between wanted and actual share values for each of the competing operators.

13. The node entity of claim 12, wherein the scheduler controller is further configured to determine the operator to be prioritized in the next TTI to be used for transmission by selecting the operator whose calculated deviation value between wanted and actual share values is the maximum value of the deviation values of the competing operators.

14. The node entity of claim 9, wherein the scheduler controller is further configured to test whether the next TTI is a TTI with competition.

15. The node entity of claim 14, wherein the scheduler controller is further configured to update entries in the sliding window list.

16. The node entity according to claim 9, wherein the sliding window list comprises at least one of the following entries:

- n, which is the total number of TTIs with competition;
- nTTIi, which is the number of TTIs with competition for operator;
- the inserted, scheduled TTI, which is identified and marked as a TTI with or without competition, where the scheduled TTI is the latest TTI introduced into the sliding window; and
- which operator that is prioritized in the inserted, scheduled TTI.

* * * * *